US012690504B2

(12) United States Patent
Heino

(10) Patent No.: US 12,690,504 B2
(45) Date of Patent: Jul. 28, 2026

(54) GARDEN TOOL

(71) Applicant: Motoseal Components Oy, Rauma (FI)

(72) Inventor: Jussi Heino, Rauma (FI)

(73) Assignee: Motoseal Components Oy, Rauma (FI)

( * ) Notice: Subject to any disclaimer, the term of this patent is extended or adjusted under 35 U.S.C. 154(b) by 539 days.

(21) Appl. No.: 18/312,288

(22) Filed: May 4, 2023

(65) Prior Publication Data

US 2024/0057491 A1     Feb. 22, 2024

(30) Foreign Application Priority Data

May 6, 2022     (FI) ..................................... 20225396

(51) Int. Cl.
| | |
|---|---|
| *A01B 1/22* | (2006.01) |
| *A01B 1/20* | (2006.01) |
| *A01D 7/04* | (2006.01) |
| *B25G 3/38* | (2006.01) |
| *E01H 5/02* | (2006.01) |

(52) U.S. Cl.
CPC ................ *A01B 1/222* (2013.01); *A01B 1/20* (2013.01); *B25G 3/38* (2013.01); *E01H 5/02* (2013.01); *A01D 7/04* (2013.01)

(58) Field of Classification Search
CPC .. A01B 1/222; A01B 1/20; B25G 3/38; B25G 3/20
USPC ............ 294/49, 51, 53.5; 172/375, 371, 372
See application file for complete search history.

(56) References Cited

U.S. PATENT DOCUMENTS

| | | | |
|---|---|---|---|
| 4,245,368 A | 1/1981 | Cotey et al. | |
| 4,996,834 A | 3/1991 | Geist | |
| D392,854 S | 3/1998 | Gregory | |
| 2008/0185856 A1 | 8/2008 | Dewinter | |
| 2010/0192738 A1* | 8/2010 | Fenstemaker | B25F 1/00 |
| | | | 81/489 |
| 2012/0102908 A1 | 5/2012 | Gayewski | |
| 2017/0280612 A1 | 10/2017 | Teutsch | |

(Continued)

FOREIGN PATENT DOCUMENTS

| | | | |
|---|---|---|---|
| DE | 103 32 403 | 2/2005 | |
| FR | 3080737 B1 * | 8/2020 | B25G 1/102 |

(Continued)

OTHER PUBLICATIONS

Sep. 19, 2023 Search Report issued in European Patent Application No. 23171202.7, pp. 1-7.

(Continued)

*Primary Examiner* — Christopher J Sebesta
*Assistant Examiner* — Evan A Bregel
(74) *Attorney, Agent, or Firm* — Nixon & Vanderhye PC

(57) ABSTRACT

In the presented solution, a garden tool includes a handle and a tool part, which handle is attached to the tool part to constitute a pulling handle. Then, the garden tool is mainly used by pulling from its handle. The handle includes an operating part which is grabbed when using the garden tool and a connecting part to attach the handle to the tool part. Between the operating part and the connecting part, there is an angle such that the axial direction of the operating part differs from the axial direction of the connecting part. The connecting part is further attached into connection with the tool part such that the connecting part is able to rotate around its axial direction in relation to the tool part.

15 Claims, 2 Drawing Sheets

(56)     References Cited

U.S. PATENT DOCUMENTS

2018/0184568 A1 *   7/2018   Martin ..................... A01B 1/16
2022/0032443 A1 *   2/2022   Resh ........................ B25G 1/04

FOREIGN PATENT DOCUMENTS

WO        WO-02102137 A1 *  12/2002    .............. A01D 7/10
WO        2005016110 A1     2/2005

OTHER PUBLICATIONS

Finland Search Report for FI20225396 dated Dec. 2, 2022, 2 pages.

* cited by examiner

GARDEN TOOL

BACKGROUND OF THE INVENTION

The invention relates to garden tools and particularly to garden tools which are mainly used by pulling from their handle.

The use of garden tools is typically at least somewhat physically straining. Therefore, it is important that garden tools are durable and easy-to-use as well as using them is ergonomic.

BRIEF DESCRIPTION OF THE INVENTION

It is thus an object of the invention to develop a novel type of a garden tool. The arrangement according to the invention is characterised by what is disclosed in the independent claims. Some embodiments of the invention are disclosed in the dependent claims.

In the presented solution, the garden tool includes a handle and a tool part, which handle is attached to the tool part to form a pulling handle. Then, the garden tool is mainly used by pulling from its handle. The garden tool is applicable to be used outdoors. Hence, the structure, materials and durability of the garden tool are such that the tool endures strains and conditions of work done outdoors. The handle includes an operating part which is grabbed when using the garden tool and a connecting part to attach the handle to the tool part. Between the operating part and the connecting part, there is an angle such that the axial direction of the operating part differs from the axial direction of the connecting part. The connecting part is further attached into connection with the tool part such that the connecting part is able to rotate around its axial direction in relation to the tool part. Then, the garden tool can, in a simple and reliable manner, be provided such that the angle between the handle and the tool part can be changed. When using the garden tool, the direction of the tool part can thus be selected optimal for each work stage, whereby the work area of the task being performed by the garden tool becomes large. Furthermore, the work position can be kept ergonomic in different situations. For example, the tool part can be set quite far away from the worker's body and, at the same time, the handle can be rotated around the axial direction of the connecting part such that the upper part of the handle, that is, the operating part turns towards the worker's body. Here, the worker does not need to extend their hands far away from their body when using the garden tool, whereby the work position remains ergonomic. In addition, the garden tool can be utilised better than previously in connection with awkward targets, such as inner corners, outer angles or stairs. The angle between the handle and the tool can be easily changed and kept as desired by rotating the handle around the axial direction of its connecting part, because this rotation occurs by rotating the operating part of the handle. The angle is easily kept as desired e.g. when the tool part is in the working position against the ground and the user of the garden tool has grabbed the garden tool from the operating part of the handle.

According to an embodiment, the tool part includes a sleeve, inside of which the end of the connecting part of the handle is arranged. Consequently, the tool part and the handle can be attached simply and reliably. Inside the sleeve, the connecting part of the handle is able to rotate smoothly and dependably. A feature provided by the construction formed by the sleeve and the end of the connecting part arranged inside it is that the force of the handle can be particularly well conveyed to control the tool part and its use position. Particularly, the work angle of the tool part can be controlled especially reliably.

According to an embodiment, the sleeve of the tool part includes a slot and the connecting part of the handle includes a protrusion which is arranged to move in the slot. This type of an arrangement is structurally simple and strong. The protrusion can be e.g. a screw or a bolt attached to the connecting part by screwing. The protrusion can also be a protrusion formed in the connecting part of the handle which is of the same structure with the other connecting part and which is arranged e.g. in connection with a flexible projection such that the protrusion can be pushed downwards, when the connecting part is pushed to the sleeve, and the protrusion rises upwards and snaps to the slot, when the connecting part is in place inside the sleeve.

According to an embodiment, the connecting part is able to rotate in relation to the tool part from its centre position for at least 25° into both directions. Thus, the garden tool is usable in a versatile way and both right-handedly and left-handedly based on the user's habits, that is, if the user wants to position their right or left hand lower on the handle.

According to an embodiment, the connecting part is able to rotate in relation to the tool part for at least 210°. Then, the garden tool has even more versatile uses. The garden tool can be easily used both on the ground level and, if needed, e.g. for cleaning the roof of litter or snow.

According to an embodiment, the connecting part is able to rotate in relation to the tool part for over 360°. Then, the relation of the tool part and the handle to each other can be provided freely at a desired angle, whereby the garden tool is easily adaptable to different work targets.

According to an embodiment, the connecting part is able to rotate in relation to the tool part for less than 360°. Then, the rotation of the handle and the tool part in relation to each other can be limited. For example in extreme positions, the handle cannot rotate any more into a specific direction, whereby the handle and tool part support each other.

According to an embodiment, the axial direction of the operating part of the handle differs from the axial direction of the connecting part for at least 15°. The larger the angle between the operating part and the connecting part of the handle is, the less there is need to rotate the handle to achieve an angle between the tool part and the handle. Controlling the tool part of the garden tool is easier when the angle between the operating part and the connecting part of the handle is not too gentle. The garden tool is also reasonably simple to arrange to be used both in connection with the ground and in connection with the roof when the angle between the operating part and the connecting part is reasonably large.

According to an embodiment, the tool part is a blade of a scraper, a blade of a rake or a brush part of a brush. The garden tool can then be e.g. a scraper, a rake or a brush. The bristles of the brush are typically quite sturdy and durable in order for the brush be applicable for outdoor use.

BRIEF DESCRIPTION OF THE DRAWINGS

The invention will now be described in closer detail in connection with some embodiments and with reference to the accompanying drawings, in which.

DETAILED DESCRIPTION OF THE INVENTION

Figures 1, 2, 3, 4:
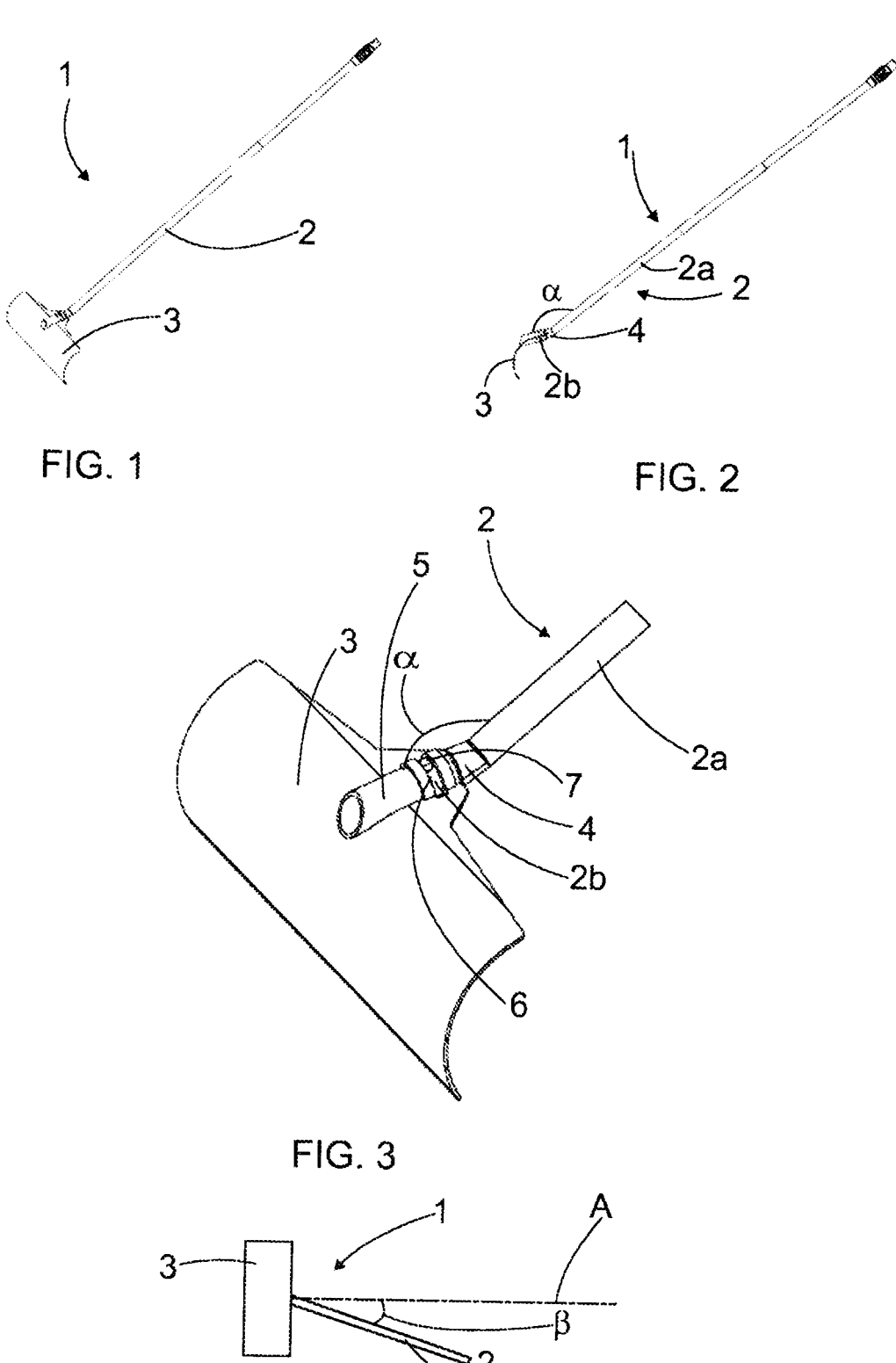
FIG. 1 is a schematic oblique back view of a garden tool.
FIG. 2 is a schematic side view of the garden tool of FIG. 1.
FIG. 3 is a schematic view of a detail of the garden tool of FIG. 1.
FIG. 4 is a schematic top view of a garden tool.

FIG. 1 shows a garden tool 1. The garden tool 1 includes a handle 2 and a tool part 3. In the embodiment of FIG. 1, the tool part 3 is a blade of a scraper, whereby the garden tool 1 is a scraper.

The shape of the blade of the scraper shown in FIG. 1 is curved. The scraper blade is attached to a handle 2 of the scraper, whereby the handle 2 of the scraper is oriented to the direction pointed by the concave side of the scraper blade. The scraper shown in FIG. 1 can be used, for example, as a snow tool, e.g. for removing a layer of snow of some centimetres from pathways, such as pedestrian passages and stairs. The scraper can also be used as a tool in gardening or earthworks for levelling soil, such as e.g. for lawn groundwork or the bedding sand for paving.

The scraper blade comprises a curved section having a bottom edge and a top edge. A concave side or a concave surface of the concave section forms a front surface of the scraper blade and a convex side or a convex surface of the concave section which forms a rear surface of the scraper blade.

When the scraper is being used, the bottom edge of the scraper is oriented downwards and held against e.g. the surface to be cleared of snow or to the layer of soil being levelled. Next, the scraper is pulled such that the concave side of the scraper blade moves forward to the direction pointed by the handle 2 towards the user of the scraper and, when desired, past the user. This way, the garden tool is mainly used by pulling from its handle. The handle 2 is thus a pulling handle. Even though the handle 2 is a pulling handle, it is also possible to use the garden tool by pushing from the handle 2 or by using the handle in some other way. For example, the garden tool 1 can be used for lifting litter, compost or some other material from the ground. When the scraper moves towards the user of the scraper, a section above the bottom edge of the scraper blade scrapes snow or soil from the ground. Guided by the concave surface and the straight section of the scraper blade, the portion of snow or soil scraped by the scraper blade moves or is thrown forward in the direction into which the handle 2 of the scraper points, the scraper blade leaving behind a ground from which snow is cleared or roughness levelled.

The curved section of the blade can be symmetrically curved, i.e. a section curved in the shape of a circular arc and comprising a curved section corresponding to only one radius of curvature of a circle. The curved section of the blade can also be asymmetrically curved, i.e. the curved section can comprise several successive curved sections along the entire curved section, the radii of curvature of a circle corresponding to which differing from one another or then the curved section of the blade can be curved spirally or curved in some other way.

In practice, the design and dimensioning of the scraper blade can vary in many different ways. The width of the blade, i.e. the blade dimension in a direction substantially perpendicular to the direction between the bottom edge and the top edge of the blade can vary e.g. between 200-700 mm, preferably between 350-600 mm. Furthermore, the height of the blade, i.e. the shortest distance between the bottom edge and the top edge of the blade can vary between 50-350 mm.

FIG. 3 shows a detail of the garden tool, where the handle 2 is attached to the tool part 3. The handle 2 includes an operating part 2*a* which is grabbed when using the garden tool 1 and a connecting part 2*b* to attach the handle 2 to the tool part 3.

The handle 2 as a whole is not straight but there is an angle 4 between the operating part 2*a* of the handle and the connecting part 2*b* of the handle. Thus, the axial direction of the operating part 2*a* of the handle differs from the axial direction of the connecting part 2*b* of the handle. In other words, the angle α between the operating part 2*a* of the handle and the connecting part 2*b* of the handle is smaller than 180°.

At the angle 4, the operating part 2*a* of the handle can be immediately against the connecting part 2*b* of the handle. The angle 4 between the operating part 2*a* of the handle and the connecting part 2*b* of the handle can also be provided by using an angle piece the axial direction of which can differ from both the axial direction of the operating part 2*a* of the handle and the axial direction of the connecting part 2*b* of the handle.

According to an embodiment, the axial direction of the operating part 2*a* of the handle differs from the axial direction of the connecting part 2*b* for at least 15°. If the axial direction of the operating part 2*a* of the handle differs from the axial direction of the connecting part 2*b* of the handle for 15°, the angle α between the operating part 2*a* of the handle and the connecting part 2*b* of the handle is 165°.

According to an embodiment, the axial direction of the operating part 2*a* of the handle differs from the axial direction of the connecting part 2*b* for at least 20°. According to an embodiment, the axial direction of the operating part 2*a* of the handle differs from the axial direction of the connecting part 2*b* for 25-30°. According to an embodiment, the axial direction of the operating part 2*a* of the handle differs from the axial direction of the connecting part 2*b* for less than 60°.

The handle 2 is attached to the upper part of the tool part 3. For attachment, the tool part 3 includes a sleeve 5, inside of which the end of the connecting part 2*b* of the handle is arranged. The sleeve 5 is thus arranged in the upper part of the tool part 3. The sleeve 5 comprises a tubular section which is cylindrical or circular of its cross-section. The end of the connecting part 2*b* of the handle is pushed inside the sleeve 5 to attach the tool part 3 to the handle 2. In the embodiment of FIG. 2, the sleeve 5 or its tubular section has a substantially constant cross-section in its longitudinal direction, but the sleeve 5 or its tubular section could also have a cross-section which narrows evenly from the direction of the handle 2 towards the direction away from it.

The connecting part 2*b* of the handle and the sleeve 5 are coaxial when the handle 2 is attached to the tool part 3. The shape of the outer surface of the connecting part 2*b* of the handle corresponds the shape of the inner surface of the sleeve 5. Preferably, both have a circular cross-section. The cross-section can also differ from the circular one e.g. in such an embodiment where both have shoulders which limit the rotation angle of the connecting part 2*b* of the handle and the sleeve 5. In such a structure, both the connecting part 2*b* and the sleeve 5 could include joint curved sections and the connecting part 2*b* could include a protrusion which could be able to move in the rotation direction in a recess inside the sleeve 5 from one side of the recess to the other.

The sleeve 5 of the tool part 3 includes a slot 6 and the connecting part 2*b* of the handle includes a protrusion 7 which is arranged to move in the slot 6. The slot 6 is formed in the sleeve 5 in the direction of its circumference. The protrusion 7 of FIG. 3 can be e.g. a screw or a bolt attached to the connecting part 2*b* by screwing. The protrusion 7 can also be a protrusion provided in the connecting part 2b of the handle which is of the same structure with the other connecting part 2b and which is arranged e.g. in connection with a flexible projection such that the protrusion can be pushed downwards, when the end of the connecting part 2b is pushed to the sleeve 5, and the protrusion 7 rises upwards and snaps to the slot 6, when the connecting part 2b is in place inside the sleeve 5.

The slot 6 is formed to extend totally around the sleeve 5. The protrusion 7 is in the slot 6 thus preventing the connecting part 2b from detaching from the tool part 3. The slot 6 still allows the protrusion 7 and thus the connecting part 2b of the handle to rotate freely inside the sleeve, i.e. more than 360°.

The slot 6 can also be formed ending in the rotation direction. Then, the protrusion 7 and thus the connecting part 2b inside the sleeve 5 are able to rotate only in a limited way, i.e. less than 360°. The amount that the connecting part 2b is able to rotate depends on the dimensioning of the slot 6 and the protrusion 7. On the other hand, there can be e.g. two protrusions 7, whereby both protrusions 7 determine by their position the length to which the connecting part can rotate in both directions. Then, the protrusion 7 could also be such that their positions around the connecting part 2b were replaceable. By moving the positions of the protrusion, it would be possible to select what kind of rotation angle the connecting part 2b has at its maximum.

In the example shown in the figures, the sleeve 5 to attach the tool part 3 to the handle 2 is arranged in the centre of the tool part 3 in the width direction of the tool part 3, but the position of the sleeve 5 can also differ from that shown in the figures. Hence, the attaching structure is not necessarily in the centre of the tool part.

FIG. 4 illustrates rotating the handle 2 from the centre position towards the side. The handle 2 is attached to the centre of the tool part 3 in its width direction. A dashed line A shows the handle 2 when it is in the centre position. When the handle 2 is rotated around the axial direction of the connecting part 2b, the operating part 2a of the handle 2 moves away from the centre position A in question. Then, the position of the operating part 2a of the handle 2 differs for an angle 1 from the centre position A in question. It can be presented by way of examples that, if the axial direction of the operating part 2a of the handle differs from the axial direction of the connecting part 2b of the handle for 30°, and the handle 2 is rotated around the axial direction of the connecting part 2b for 45°, the angle 1 in question is then 15°.

The tool part 3 of the garden tool 1 can be e.g. a blade of a scraper, a blade of a rake or a brush part of a brush. The garden tool 1 can then be e.g. a scraper, a rake or a brush.

The garden tool 1 can be used for treating material on the ground surface or the ground surface itself. Furthermore, the garden tool 1 can be used for treating the surface of a roof, if desired. The treating of the roof surface can include e.g. dropping snow from the roof and/or cleaning the roof surface.

In an embodiment, where the connecting part 2b is able to rotate in relation to the tool part 3 for at least 180°, the tool part 3 of the garden tool 1 can be rotated to an optimal working angle in relation to the handle 2 both when the garden tool 1 is used for treating material on the ground surface or the ground surface itself and when the garden tool 1 is used for e.g. treating the roof surface.

The handle 2 can be a telescopic handle. For example when the garden tool 1 is used for treating the roof surface, the handle 2 is preferably a telescopic handle. Then, the handle 2 can be lengthened sufficiently for e.g. treating the roof and shortened sufficiently for some other use. For treating the roof surface, the handle 2 and/or the tool part 3 can be arranged, if needed, with pads in order to avoid damaging the roof when handling the garden tool.

If desired, the operating part 2a of the handle 2 can be provided with a fast coupling, whereby it is possible to separate the operating part 2a into two parts and then again combine the parts. Thus, the upper part of the operating part 2a can constitute one part of the handle 2, and the lower part of the operating part 2a, the angle 4 and the connecting part 2b can constitute another part of the handle 2.

Figure 5:
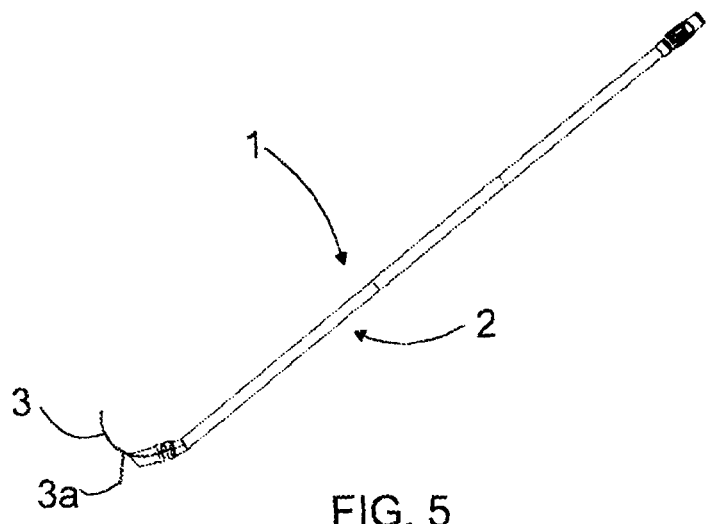
FIG. 5 is a schematic side view of another garden tool.

FIG. 5 shows an embodiment where the back surface of the tool part 3 includes an additional part 3a. The additional part 3a can be e.g. a blade, a brush or a rake part. In the embodiment of FIG. 5, the tool part 3 is curved for its main part, whereby the additional part 3a is arranged on the convex side of the curved part of the tool part 3.

In the situation of FIG. 5, the handle 2 is rotated for 180° from the main use position. In this case, the garden tool 1 is used the additional part 3a being downwards.

The tool part 3 together with all of its features presented above is preferably a single uniform piece at least when the tool part 3 is a scraper blade or a rake blade. The blade can be made as a single uniform piece of e.g. metal or plastic material. A blade made of plastic material can be manufactured as a single uniform piece e.g. by injection moulding. When manufacturing the tool part 3 at least mainly of plastic material, the material to be used can be e.g. polypropylene PP or polyethylene PE, such as a high-density polyethylene HDPE, or some other plastic grade that sustains impacts well even at cold temperatures or at sub-zero temperatures.

Those skilled in the art will find it obvious that, as technology advances, the basic idea of the invention can be implemented in many different ways. The invention and its embodiments are thus not restricted to the examples described above but can vary within the scope of the claims.

The invention claimed is:

1. A garden tool for outdoor use, comprising:
    a handle and a tool part,
    wherein the handle is attached to the tool part to provide a pulling handle, such that the garden tool is usable mainly by pulling the handle when the garden tool is assembled and in one of a plurality of different use configurations,
    wherein the handle includes an operating part and a connecting part, wherein the operating part is configured to be grabbed when using the garden tool, the connecting part attaching the handle to the tool part,
    wherein a first angle is formed between the operating part and connecting part such that the axial direction of the operating part differs from the axial direction of the connecting part,
    wherein an end of the connecting part is attached to, and in swivelable connection with, the tool part such that the connecting part rotatable around its axial direction in relation to the tool part to change the garden tool, when already assembled, between the different use configurations, a first use configuration of the different use configurations being a center position of the connecting part relative to the tool part and a second use configuration of the different use configurations being a second angle off of the center position, and
    wherein the tool part includes a sleeve, inside of which the end of the connecting part of the handle is arranged.

2. The garden tool according to claim 1, wherein the sleeve includes a tubular section having a substantially constant cross-section in its longitudinal direction, and wherein the shape of the connection part corresponds the shape of the inner surface of the sleeve.

3. The garden tool according to claim 1, wherein the sleeve of the tool part includes a slot and the connecting part of the handle includes a protrusion which is arranged to move in the slot.

4. The garden tool according to claim 1, wherein the connecting part is rotatable in relation to the tool part from its center position by at least 25° into both directions.

5. The garden tool according to claim 1, wherein the connecting part is rotatable in relation to the tool part by at least 210°.

6. The garden tool according to claim 1, wherein the connecting part is rotatable in relation to the tool part by over 360°.

7. The garden tool according to claim 1, wherein the connecting part is rotatable in relation to the tool part by less than 360°.

8. The garden tool according to claim 1, wherein the axial direction of the operating part of the handle differs from the axial direction of the connecting part by at least 15°.

9. The garden tool according to claim 1, wherein the tool part is a blade of a scraper, a blade of a rake, or a brush part of a brush.

10. The garden tool according to claim 1, wherein the back surface of the tool part includes an additional part.

11. The garden tool according to claim 10, wherein the tool part includes a curved part and the additional part is arranged on the convex side of the curved part.

12. The garden tool according to claim 3, wherein the protrusion is a screw or bolt attached to the connecting part by screwing.

13. The garden tool according to claim 3, wherein the protrusion is provided in the connecting part.

14. The garden tool according to claim 3, wherein the protrusion includes a flexible projection.

15. The garden tool according to claim 3, wherein the protrusion is configured to be pushed in a first direction when the end of the connecting part is pushed into the sleeve, the protrusion rising in a second direction opposite the first direction and snapping into the slot when the connecting part is in place inside the sleeve.

* * * * *